United States Patent
Fabbio et al.

Patent Number: 5,870,089
Date of Patent: Feb. 9, 1999

[54] APPARATUS AND PROCESS FOR DISTRIBUTING INFORMATION USING AN ELECTRONIC PACKAGE REPRESENTATION

[75] Inventors: Robert Fabbio; Eric Rothfus, both of Austin, Tex.

[73] Assignee: Dazel Corporation, Austin, Tex.

[21] Appl. No.: 978,505

[22] Filed: Nov. 24, 1997

Related U.S. Application Data

[63] Continuation of Ser. No. 330,390, Oct. 27, 1994, abandoned.

[51] Int. Cl.$^6$ ........................................... G06F 3/00
[52] U.S. Cl. .......................................... 345/335; 395/200.3
[58] Field of Search .......................... 345/329, 330, 345/331, 335, 971, 968; 395/200.3, 200.31, 200.33, 200.57, 200.62, 200.66, 200.76

[56] References Cited

U.S. PATENT DOCUMENTS

| | | | |
|---|---|---|---|
| 4,480,308 | 10/1984 | Grafe et al. | 364/222.2 X |
| 4,694,452 | 9/1987 | Beckinger et al. | 370/58 |
| 4,713,780 | 12/1987 | Schultz et al. | 395/200.36 |
| 4,754,428 | 6/1988 | Schultz et al. | 395/200.76 |
| 4,837,798 | 6/1989 | Cohen et al. | 379/88.14 |
| 4,924,426 | 5/1990 | Kameda et al. | 395/427 |
| 4,941,170 | 7/1990 | Herbst | 379/100.07 |
| 5,124,909 | 6/1992 | Blakely et al. | 395/200.33 |
| 5,144,548 | 9/1992 | Salandro | 364/138 |
| 5,210,824 | 5/1993 | Putz et al. | 707/523 |
| 5,283,887 | 2/1994 | Zachery | 395/500 |
| 5,307,490 | 4/1994 | Davidson et al. | 395/684 |
| 5,315,635 | 5/1994 | Kane et al. | 455/31.2 |
| 5,333,266 | 7/1994 | Boaz et al. | 395/200.36 |
| 5,513,323 | 4/1996 | Williams et al. | 395/200.76 |
| 5,517,662 | 5/1996 | Coleman et al. | 395/800 |
| 5,551,428 | 9/1996 | Godlewski et al. | 128/653.1 |

FOREIGN PATENT DOCUMENTS

| | | |
|---|---|---|
| 5268226 | 10/1993 | Japan . |
| 5308375 | 11/1993 | Japan . |
| 5308379 | 11/1993 | Japan . |
| 5314031 | 11/1993 | Japan . |
| 6014053 | 1/1994 | Japan . |

OTHER PUBLICATIONS

AR. Massachusetts Institute of Technology, "Palladium Print System, Palladium Design Document." Dec. 1991, pp. 1–1 to1–5 and 2–1 to 2–6.

*Primary Examiner*—A. Katbab
*Attorney, Agent, or Firm*—Shaffer & Culbertson; Russell D. Culbertson

[57] ABSTRACT

A system and a method are both described for transferring data throughout computer systems, computer networks, data transmission facilities, and the like from an originating location to destination devices (50) at various physical locations. An electronic package data structure (10) is also described that includes document references (14), destination references (16), and package attributes (18, 28, 40). The document references (14) may be document names and locations or actual document contents. Destination references (16) identify printers, e-mail addresses, facsimile machines, electronic pagers and the like. A graphical user interface or GUI (140) serves to allow a user (52) to select documents, destinations, and additional package attributes that create the electronic package data structure (10). Once the components and attributes are assembled, the GUI is used to send the package (10) to a delivery service (12). The delivery service (12) receives the package (10) and operates on instructions and data in the package to interpret the instructions and actually deliver the documents in the package to the desired destinations.

31 Claims, 8 Drawing Sheets

APPARATUS AND PROCESS FOR DISTRIBUTING INFORMATION USING AN ELECTRONIC PACKAGE REPRESENTATION

This application is a continuation of application Ser. No. 08/330,390, filed Oct. 27, 1994 now abandoned.

A portion of the disclosure of this patent document contains material which is subject to copyright protection. The copyright owner has no objection to the facsimile reproduction by anyone of the patent document, or the patent disclosure, as it appears in the Patent and Trademark Office files or records, but otherwise reserves all copyrights whatsoever.

BACKGROUND OF THE INVENTION

This invention relates to distributing one or more pieces of information in one or more forms to different types of destinations or resources such as printers, fax machines, e-mail boxes the world wide web, and pagers, for example using a delivery service system. More particularly, the invention relates to a system and method for creating electronic packages containing information to be delivered, destinations to which the information is to be delivered, and delivery instructions, and then distributing the information to the various destinations.

There has been a recent proliferation of techniques by which information may be communicated from one place to another. For example, information in the form of a document file associated with a personal computer may be transmitted via a fax modem and telephone lines to a fax machine. Other examples are sending messages via a suitable wireless transmission system to a pager, sending e-mail to an e-mail address, and transferring information in the form of a document from a personal computer to a printer for printing a hard copy of the document. In each of these four examples, information is sent to a different destination type, namely a fax machine, a pager, and a printer. The communication possibilities have escalated even more due to networks of computers such as local area networks (LANs) or wide area networks (WANs) in which a user can access or share resources connected in the network, such as printers, fax modems, pagers, and e-mail boxes, for example. A single LAN or WAN user may be able to send information to any resource associated with the network or use the resources shared on the network to communicate to others around the world.

Although the proliferation of methods for transferring or communicating information represents a vast technological improvement in itself, the various communication possibilities also present problems to the user. The basis of the problems presented by the wide variety of communication techniques now possible is that each technique has been separately used, operated, and controlled.

For example, a LAN user might have wished to fax a document to a distant fax machine through a fax modem that the user could access. In that case, the user ran the software program controlling the fax modem and entered the instructions necessary to fax the desired document to the desired fax machine. If the user also wanted to print the document on a printer accessible via the network, the user had to run the software program used to control the printer, usually the document creating or word processing software, to send the document to the printer. Thus, generally each time a user wanted to send a document or information to a particular destination or resource, the user had to separately run the particular software that controlled the transmission process or resource. Also, the delivery of a particular document or information to a certain destination often required changing the format of the document to a format acceptable to the destination. This process of separately running multiple software products to transmit information to various destinations was time consuming and required that the user have knowledge of the software controlling each transmission or resource. Having to separately format the information for each destination also required that the user have knowledge of the format needed to ensure the information looked correct when it is was sent to the target devices.

Another problem with many individual or resource specific information transmitting or distributing techniques was that the user had little or no control over the delivery process. For example, to send a document to a resource such as a printer connected in a LAN, the user often had no way to control that the job printed at a certain time or to expedite the print job. Also, there was often no way for the user to know if the document was successfully printed. The user had to call someone at the printer location to manually confirm that the print job was successfully performed.

SUMMARY OF THE INVENTION

It is therefore an object of the invention to overcome the above described problems and others associated with distributing information electronically. More particularly, it is an object of the invention to provide a system and method for producing a data structure used in distributing documents to various resources accessible by a computer or a network of computers. Another object of the invention is to provide a method and apparatus for creating a construct or metaphor for an electronic package. A further object of the invention is to provide a system and method for distributing the information to numerous different types of destinations accessible by a computer or network of computers.

A data structure according to the invention represents an electronic package and is an encapsulation of information to be delivered, destinations to which the information is to be delivered, and delivery instructions relating to delivering the information to the referenced destinations. The term "electronic package" as used herein refers to a metaphor or construct that symbolically represents the information to be delivered, destination for the information, and delivery instructions. The electronic package data structure embodies a software object which may be transferred to a delivery service software system which operates to actually deliver the designated information to the referenced destinations according to the delivery instructions. Upon the receipt of the electronic package data structure, the delivery service system interprets the instructions and data in the data structure and, pursuant to the instructions, delivers the information to the destinations referenced in the data structure.

The electronic package data structure and delivery service system according to the invention provides several important advantages. By operating a single application which communicates the electronic package data structure to the delivery service system, the invention allows a user to send one or more pieces of information to any destination accessible by the computer or computer network with which the user is associated. The user need not directly operate each independent program responsible for operating the desired destinations. Also, the user may exercise control over the delivery process by specifying delivery instructions such as the time that information is to be delivered to a particular destination or the priority of the delivery job. Additionally, the information is delivered in a guaranteed, secure, and reliable fashion.

For example, a computer network may include a printer, e-mail access, and a fax modem, all accessible by each user. A user may wish to send a document from a network-based computer to an e-mail address and fax machine outside the network and, at the same time, to a printer connected on the local area network. Each of the output resources, the e-mail box, the fax machine, and the printer, represents a destination to which the information is to be sent, that is, the document. In order to send the document according to the invention, the user first creates an electronic package data structure that includes reference to the document to be sent, references to each of the destinations including certain attributes of the destinations, and any special delivery instructions such as a time when the delivery is to occur. After creating the electronic package data structure, the user communicates the data structure to the delivery service system, and the delivery service system performs all operations necessary to deliver the document to the three different destinations, at the same time, in a guaranteed, secure, and reliable fashion.

In the preferred form of the invention, the electronic package data structure includes one or more document references, one or more destination references, package attributes, and origination information. Each document reference includes document attributes such as the name and location of the document in terms of file name and path, and also includes other document attributes such as file type and size. Similarly, each destination reference includes destination attributes such as the name and location of the destination in terms of destination name and path in the network and also the type of destination, a particular type of printer or a fax machine, for example. Each destination reference also includes other attributes of the particular destination, such as the number of copies to be made and start and end sheets, for example. The package attributes preferably include a package name and may also include the priority for delivering the documents to the particular destinations or the type of notification the user desires throughout the delivery process. The origination information specifies the location and creation time of the electronic package data structure for accounting and other administrative purposes.

The electronic package data structure according to the invention is analogous to an express mail package. Like an express mail package, the electronic package includes reference to documents, including either a reference to the document name and location or the document itself. Also, the electronic package data structure, like an express mail package, includes an identification for the destination, although in terms of destination name and path rather than a physical address. Finally, the electronic package data structure includes delivery instructions similar to delivery instructions that may be included on an express mail package, such as a specific time of delivery or some other special delivery instruction.

In part due to the analogy between the electronic package data structure and a regular express mail package, the invention also includes an apparatus and method for creating a metaphor or graphical symbolic representation of the electronic package through the use of a graphical user interface (GUI). The metaphor implemented through the GUI is used to actually create the electronic package data structure, as well as represent the data structure to a user. The preferred method includes displaying an assembly workspace within the GUI. The assembly workspace provides a graphic area in which to assemble all documents and destinations to be included in the electronic package. The method also includes displaying within the assembly workspace an icon representing each document reference to be included in the package and an icon representing each destination reference. The document and destination icons represent the content of the electronic package being created. The method also includes associating package attributes to the electronic package, also through the GUI. The package attributes may be associated in the process of defining an electronic package or after creating the electronic package.

The preferred apparatus according to the invention for creating the metaphor or graphic representation for the electronic package is implemented on a suitable general purpose computer. The apparatus includes assembly workspace defining means programmed within the computer to produce the assembly workspace in the GUI. Document defining means are also programmed in the computer for displaying a document reference icon, and destination defining means are programmed for displaying a destination icon with the GUI. The program also includes package attribute defining means for adding the package attributes through the GUI and displaying a package icon for the electronic package.

Beyond the data structure and apparatus and method for creating the data structure, the invention also includes the delivery service software system for acting on the electronic package data structure to distribute the information to the various destinations defined in the electronic package data structure. The method that the delivery service system software implements includes first receiving the electronic package by a delivery manager and then storing, locally to the delivery manager, all documents to be delivered. The delivery manager consults a name service to identify a delivery request broker associated with each destination specified. The method also includes transferring to each delivery request broker the appropriate document, destination reference, and package attributes to be delivered to the destination or destinations with which the delivery request broker is associated. Each delivery request broker first performs administrative functions such as checking document access rights, and then queues the document, destination reference, and package attributes for transfer to a delivery supervisor associated with the corresponding destination. The delivery supervisor, after receiving the document, destination reference, and package attributes from the spooler, interprets the destination attributes associated with the destination reference, performs the necessary data translations to translate the document to a format suitable for delivery to the particular destination, and then actually communicates the document to the specified destination or destinations.

Each function within the delivery service is implemented in a suitable software module or component running within a digital computer. In a network, the various components of the delivery service software system may all run on the same or different CPU's throughout the network.

These and other objects, advantages, and features of the invention will be apparent from the following description of the preferred embodiments, considered along with the accompanying drawings.

DESCRIPTION OF THE PREFERRED EMBODIMENTS

Figure 1:
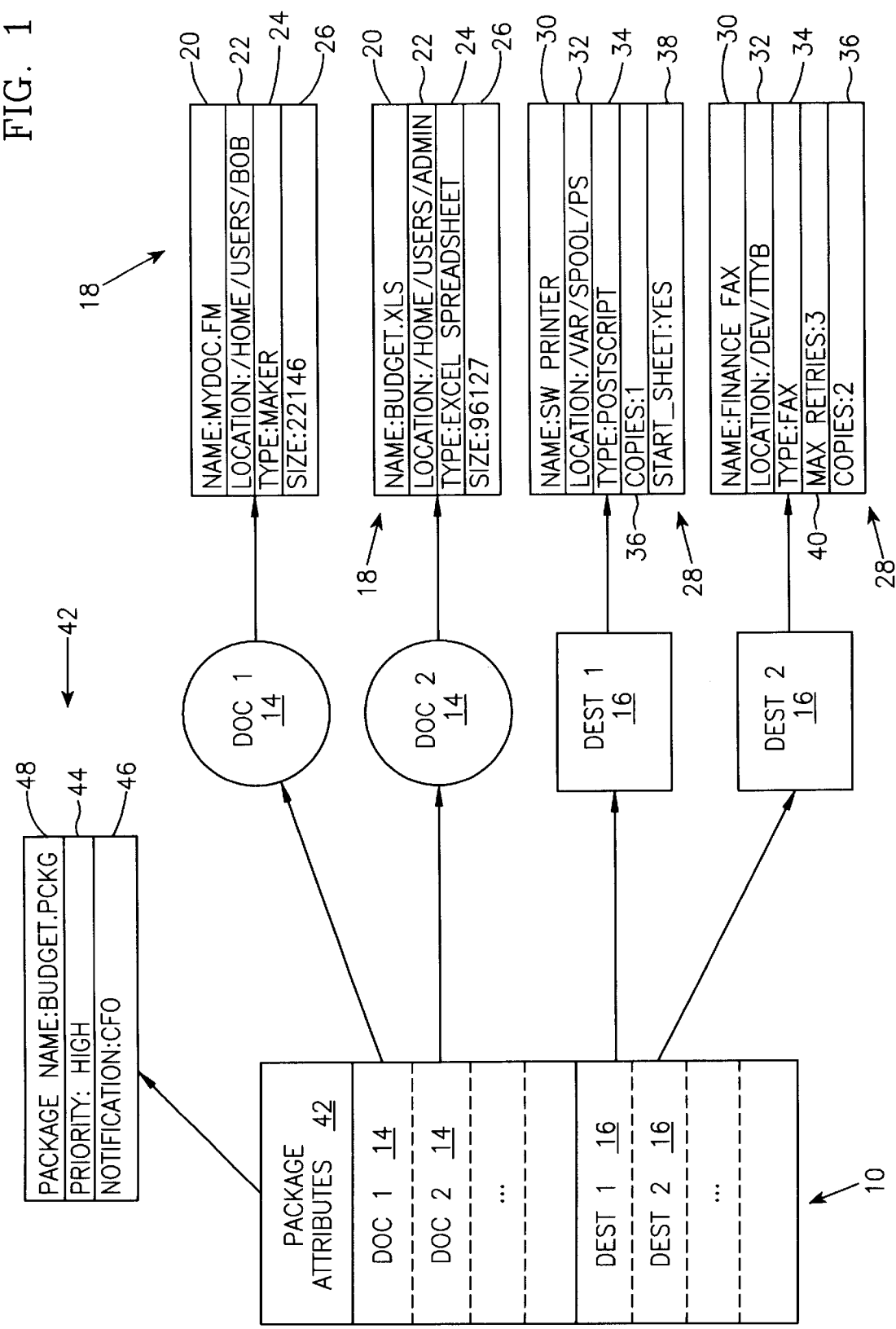
FIG. 1 is a diagrammatic representation of an electronic package data structure embodying the principles of the invention.

An electronic package data structure 10 embodying the principles of the invention is shown diagrammatically in FIG. 1. The data structure 10 is an electronic package object-type software package including both data and instructions and is used in delivering information to various devices through a delivery service system 12 illustrated in FIG. 2. The electronic package data structure 10 represents an encapsulation of information required to deliver particular information or documents through a computer or computer network to any output device accessible to the computer or computer network.

The electronic package data structure includes at least one document reference 14 and at least one destination reference 16. Each document reference 14 represents, or includes a reference to, a document to be delivered to a particular destination or destinations. Each destination reference 16 represents, or includes a reference to, a destination device to which each document referenced in the data structure is to be delivered.

Each document reference 14 includes document attributes 18, including a name 20 and location 22 for the referenced document by file name and path, and other attributes such as the file type 24 and file size 26. The type of file 24 and file size 26 may be implicit from the document name 24. Also, it will be readily apparent to those skilled in the art that, rather than the file name and location, a document within the data structure 10 may be referenced by the document itself. Therefore, for purposes of this disclosure and the claims of this patent document, the file "name" for a document may describe the actual file name alone or may alternatively refer to the entire document.

Each destination reference 16 includes a series of destination attributes 28, including the destination name 30 and location or path 32 in the computer system or network. The destination reference attributes 28 also include the type of device 34 at the named destination. Other attributes 28 in the destination reference 16 may include the number of copies to be made 36, a start sheet for a printer 38, and a number of retries 40 for a fax, for example. Numerous other destination-specific attributes 28 may be included in the destination reference 16, with each controlling the device or delivery of information to a device.

Each electronic package data structure 10 also includes package attributes 42. The package attributes 42 identify the package 10 and include special delivery or handling instructions not specific to a particular destination. For example, the package attributes 42 may include delivery priority 44. Another package attribute may be the type of notification 46 required relating to the delivery to be performed using the package. The package attributes 42 may include numerous other non-destination-specific instructions which control or affect delivery. Also, the package attributes will in each case include a package name 48.

The electronic package data structure 10 comprises data stored at a single computer memory location that includes the document file names and paths which are attributes of each document reference 14, and also includes destination names and paths which are attributes of each destination reference 16. The memory location containing the electronic package data structure 10 also includes code or instructions, representing or relating to the other attributes associated with each document reference 14, destination reference 16, and the package itself. A package name attribute and location represent an identifier for the data structure by which the data structure may be handled and tracked by the computer system or network which operates on the data structure 10.

Figure 2:
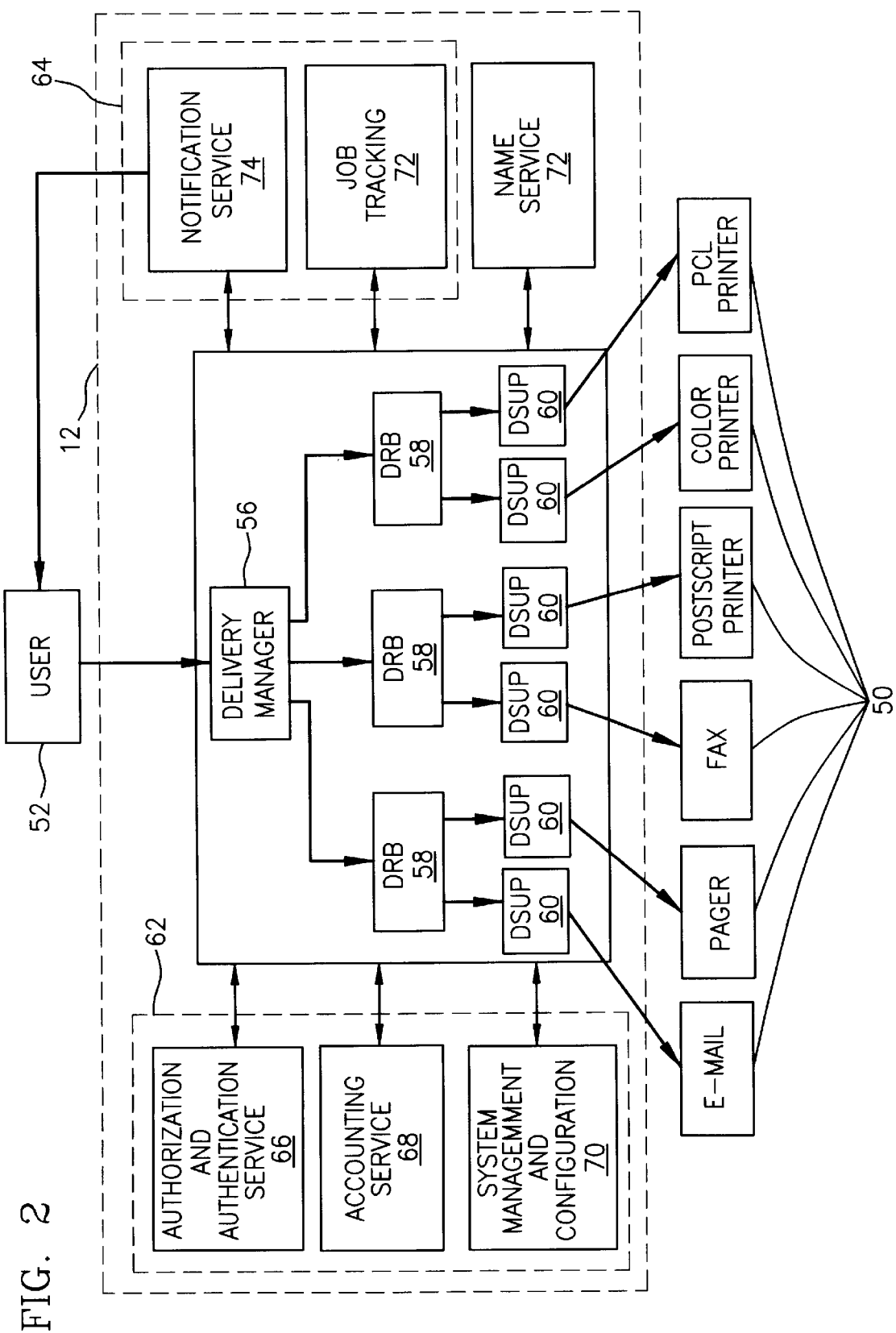
FIG. 2 is a diagrammatic representation of a delivery service software system implemented on a computer or network of computers and adapted to operate on an electronic package data structure to deliver information to various output devices.

FIG. 2 illustrates a delivery service or system 12 for interpreting delivery instructions and delivering information to output resources or devices 50 that are accessible by the computer system. More particularly, the system 12 illustrated in FIG. 2 is adapted for receiving an electronic package data structure such as described with reference to FIG. 1 and for acting on the data structure to perform the desired deliveries. The computer system on which the delivery system 12 operates may be a single computer or may be a network of computers such as a local area network (LAN) or a wide area network (WAN) which is capable of sharing resources. In any event, the computer system or network is capable of accessing a variety of output devices or resources 50 which may be connected within the network or system itself, such as printers, or maybe outside the network, such as fax machines, e-mail addresses, or pagers. Substantially any type of transmission technique may be used to communicate information to the output device or resource 50.

In the system 12, a user represented at reference numeral 52 creates an electronic package data structure (10 in FIG. 1) which includes information, destinations, and delivery instructions for delivering the information to the particular destinations. The user 52 then transmits the electronic package data structure to the delivery service 12, to initiate the delivery process. Communication between the user 52 and the delivery service 12, within the delivery service 12, and between the delivery service 12 and output devices 50 may be performed by any technique suitable to the particular computer system. The invention may, for example, be implemented in a distributed computing system or network in which processing may be performed on any processing unit throughout the system. In the distributed computing system case, all communications are preferably performed through remote procedure calls (RPCs). RPCs are program instructions that allow for or cause communication between different processors. RPCs are supported through suitable software such as the DCE software technology from the Open Software Foundation, for example.

The delivery service 12 includes multiple components including one or more delivery managers 56, one or more delivery request brokers (DRBs) 58, and a name service 72. The delivery service 12 further includes a delivery supervisor 60 associated with each type of output device 50. The delivery service 12 also includes management facilities 62 and diagnostic facilities 64. The management facilities 62 include a security component or authorization service 66, an accounting service 68, and a centralized system management and configuration service 70. The diagnostic facilities 64 include a notification service 74 and job tracking service 76.

Each element of the delivery service 12, such as a delivery manager 56 or delivery request broker 58, for example, are implemented in software programmed to operate on a suitable processor within the computer system or on separate computer systems. Within the delivery service 12, the number of each type of component may vary depending upon the particular installation. Although FIG. 2 shows, for purposes of illustration, a single delivery manager 56, more than one delivery manager may be included in the delivery service 12 according to the invention. Similarly, more or fewer delivery request brokers 58 and more or fewer delivery supervisors 60 may be included in the delivery service 12.

Figure 3:
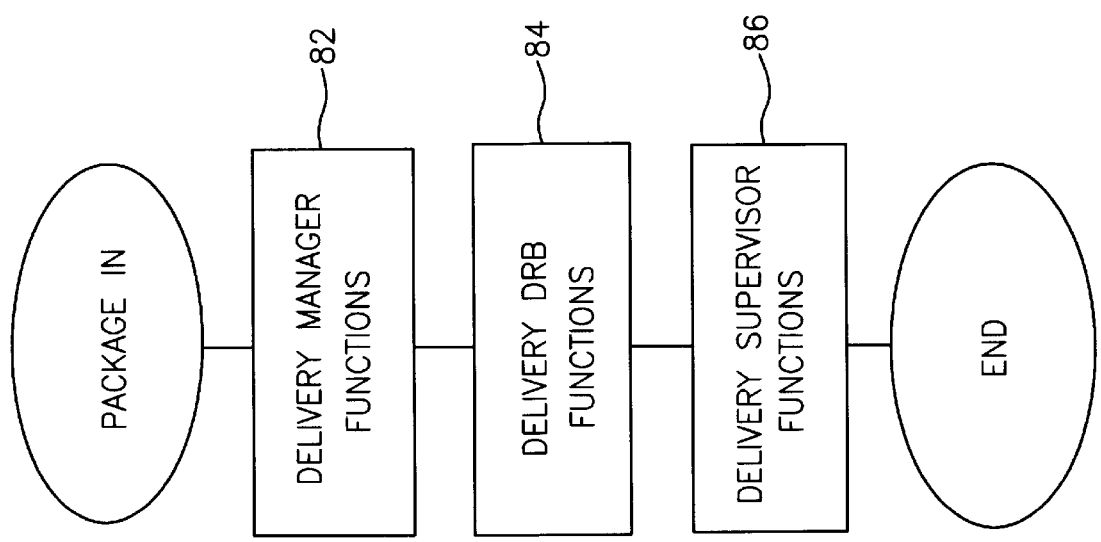
FIG. 3 is a flow diagram showing the method of operation in the delivery service software system in terms of primary components or modules within the delivery service system.

FIGS. 3 through 6 illustrate the operation of the delivery service or system 12 according to the invention and the method employed for delivering the information to various destinations. FIG. 3 shows the basic flow of operation between components of the delivery service 12 shown in FIG. 2. Referring specifically to FIGS. 2 and 3, the electronic package data structure or object enters the delivery service 12 to the delivery manager 56. The delivery manager 56 transfers, at 82, information from the package to particular delivery request brokers 58 associated with the various destinations referenced in the package. Each delivery request broker transfers at 84 information to a particular delivery supervisor 60 associated with a destination to which information is to be delivered. At block 86, the delivery supervisor 60 transfers the data or information to the destination or output device in a correct format for the particular device.

Figure 4:
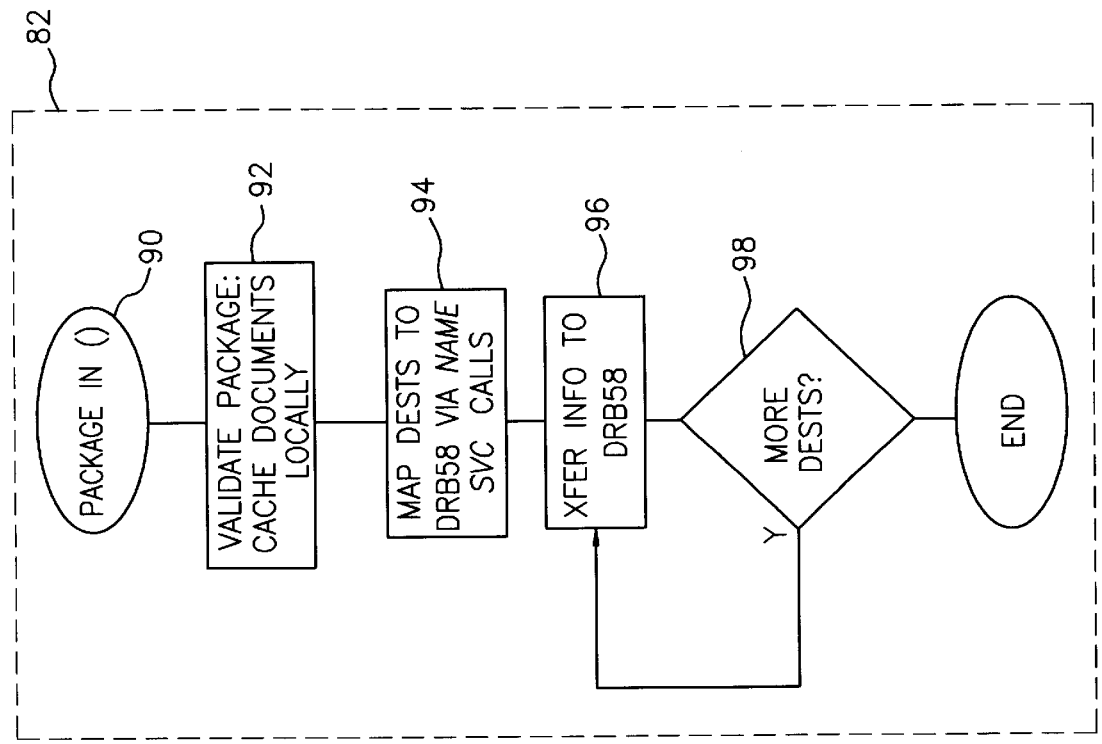
FIG. 4 is a flow diagram showing the method steps taken by the delivery managers.

FIG. 4 shows the operations 90–98 performed by the delivery manager component 56. Upon receipt 90 of an electronic package data structure, the delivery manager 56 validates the package at 92, to make sure that the package includes the appropriate information. The delivery manager 56 also at step 92 retrieves the documents referenced in the package and stores the documents locally. Next, the delivery manager 56 communicates at block 94 with the name service 72 to locate or identify any particular delivery request broker 58 associated with each particular destination referenced in the electronic package data structure and maps each destination to the particular delivery request broker 58. Once the appropriate delivery request brokers 58 are identified and the referenced destinations mapped to the appropriate delivery request broker, the delivery manager 56 transfers at block 96 information from the package to a first identified delivery request broker 58 associated with a particular destination. The delivery manager 56 determines at 98 whether any more destination references are contained in the package, and if so, the delivery manager at step 96 transfers information from the package to the other delivery request brokers 58 associated with the particular destination until no further reference destinations remain in the electronic package data structure.

Figure 5:
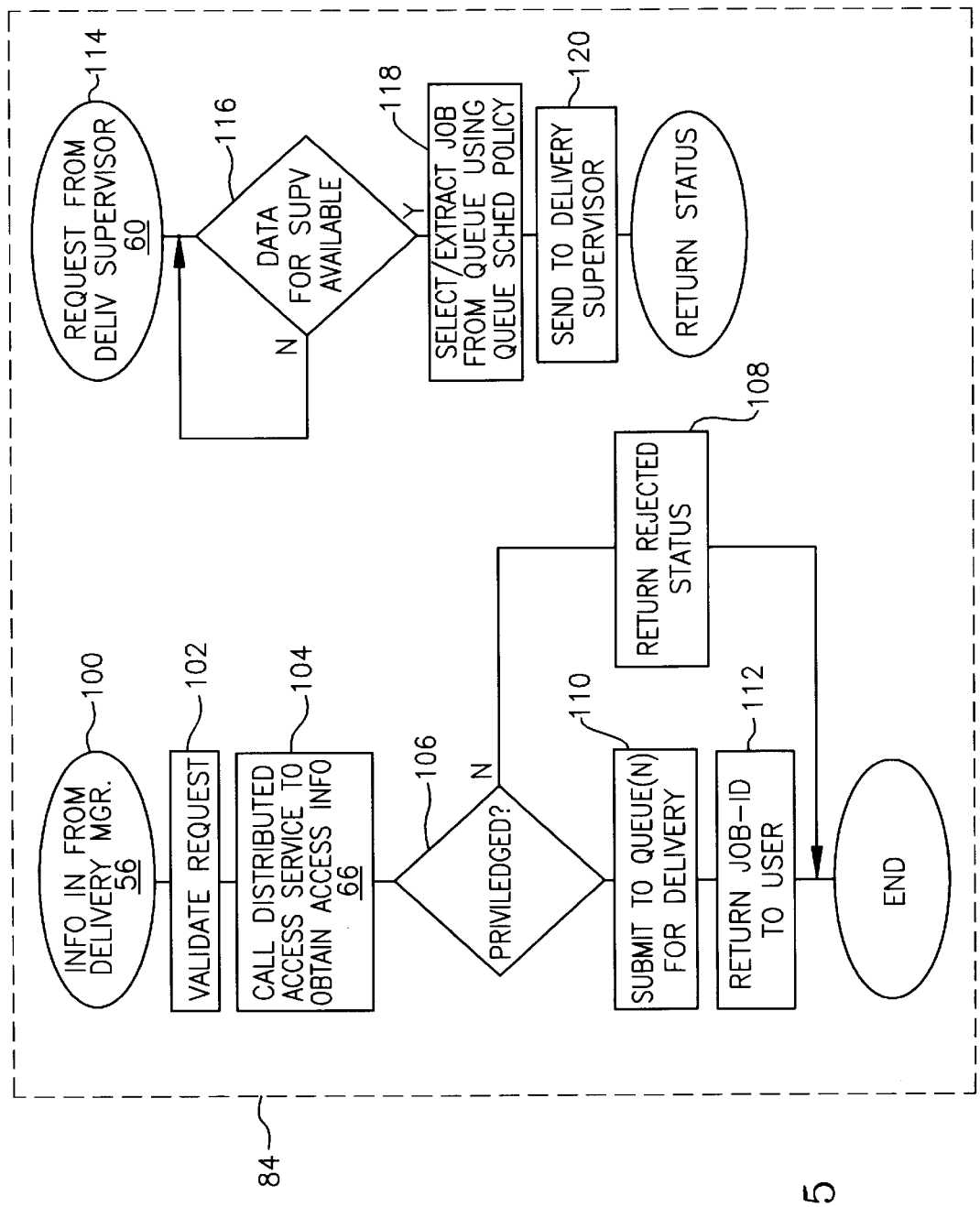
FIG. 5 is a flow diagram showing the method steps taken by the delivery request brokers.

FIG. 5 shows the operations 100–120 performed by each delivery request broker 58 to which package information is delivered from a delivery manager 56. Upon receiving package information from the delivery manager 56, the delivery request broker 58 first validates the requested action at 102 and then communicates at 104 with the security component 66 shown in FIG. 2, to determine at 106 whether the particular user has the privilege to deliver information to the requested destination. If the delivery request broker 58 determines that the user does not have appropriate access rights, it returns at block 108 a request rejected notice back to the user through the notification service 74 and ends the process. If access is allowed, the delivery request broker at 110 creates an entry on a queue for delivery, the entry being reflective of the package and, at 112, returns a job identification to the user through the notification service 74.

Referring still to FIG. 5, the delivery request broker 58 also receives, at block 114, requests or availability notification from the delivery supervisors 60 associated with the destination device 50 (FIG. 2), indicating that the particular delivery supervisor is ready to receive data and perform its function in the delivery process. The delivery request broker determines at 116 when data is available in the queue for the requesting delivery supervisor 60, and then selects and extracts the package data from the queue according to a particular queue schedule policy at 118. The delivery request broker 58 then at step 120 transfers the package information to the requesting delivery supervisor 60 and returns a status notice to the user through the notification service 74.

Figure 6:
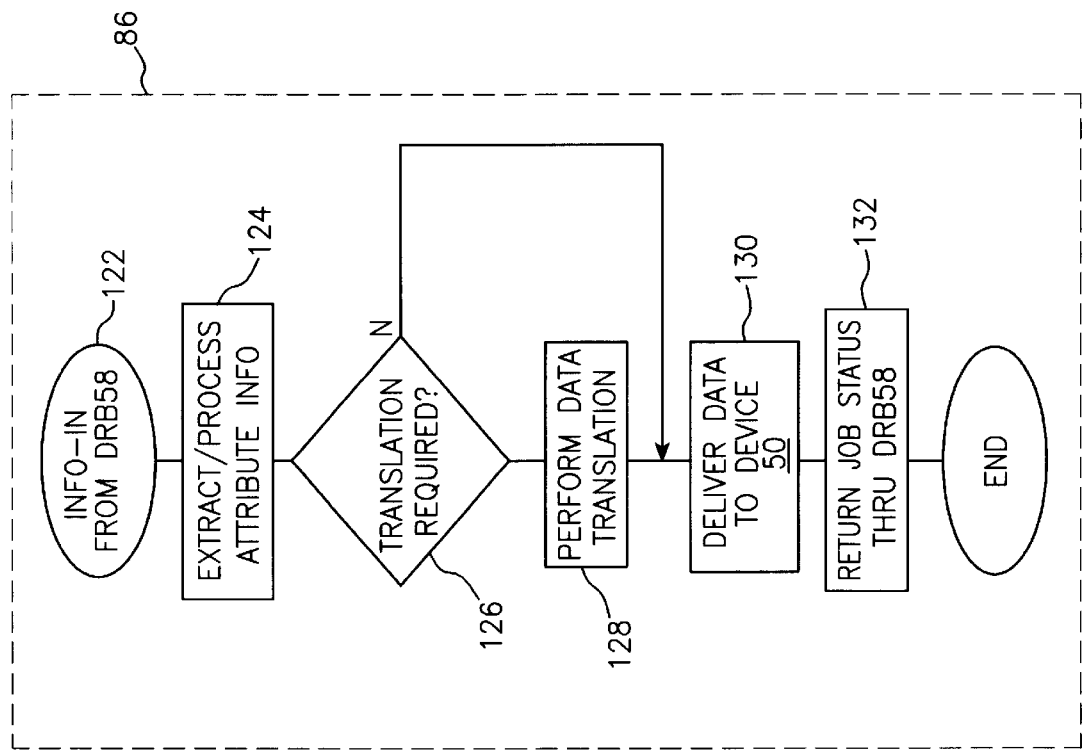
FIG. 6 is a flow diagram showing the method steps taken by the delivery supervisors.

Referring now to FIG. 6 and steps 122 to 132, the particular delivery supervisor 60 receives package information from the delivery request broker 58 at step 122 and extracts and interprets the attributes within the package at step 124. The delivery supervisor 60 determines at 126 whether data translation is required in order to send any data to the particular destination 50 for which the delivery supervisor is responsible, and if so, the delivery supervisor then performs the required translation at 128 and, at step 130, delivers the information, in the correct format, to the particular device associated with the delivery supervisor. If no data translation is required to send data to the particular destination, the delivery supervisor simply skips the translation step and delivers the information directly to the device. Finally, the delivery supervisor 60 at step 132 again notifies the delivery request broker 58 that it is ready for another job and sends a delivery notice back to the user through the notification service 74.

Other components of the delivery service 12 whose functions are not shown in the flow charts of FIGS. 3 through 6 perform management or diagnostic functions within the system. During the process of delivering documents to destinations, events of interest such as number of pages printed by a specific printer, for example, are captured and logged by the accounting service 68 for later retrieval and analysis by a user or administrator. The system management and configuration facilities 70 support the installation, set-up and ongoing control and monitoring of the system 12 in operation. The job tracking facility 76 captures each of the distinct phases through which a delivery job progresses as it travels from the user to the destination. For example, "spooled for printing", "undergoing translation", and "being printed" are typical phrases.

Figure 7:
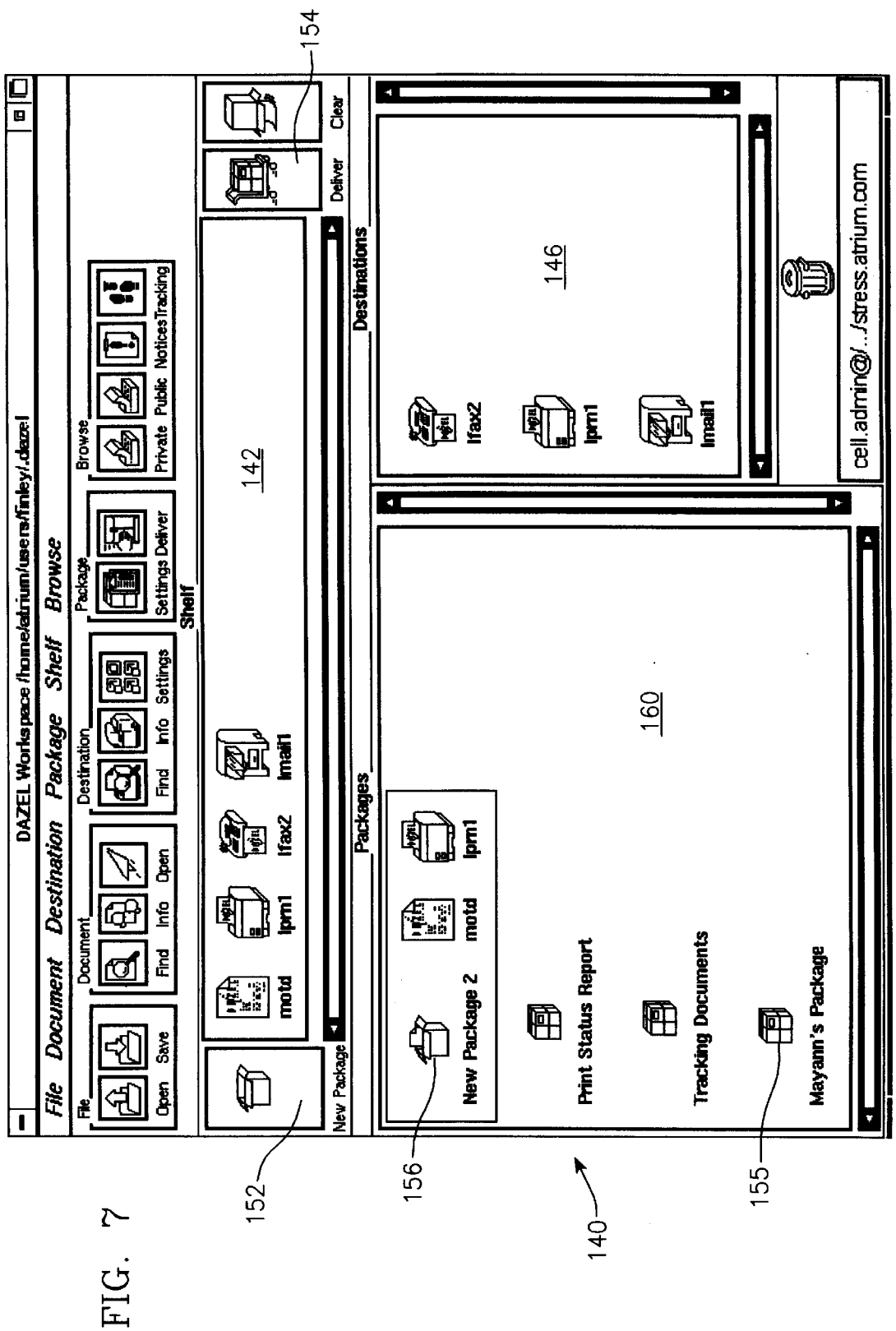
FIG. 7 is a representation of a screen display, providing a representation for an electronic package which is an encapsulation of information, destinations, and delivery instructions for delivering the information to the destinations.
Figure 7A:
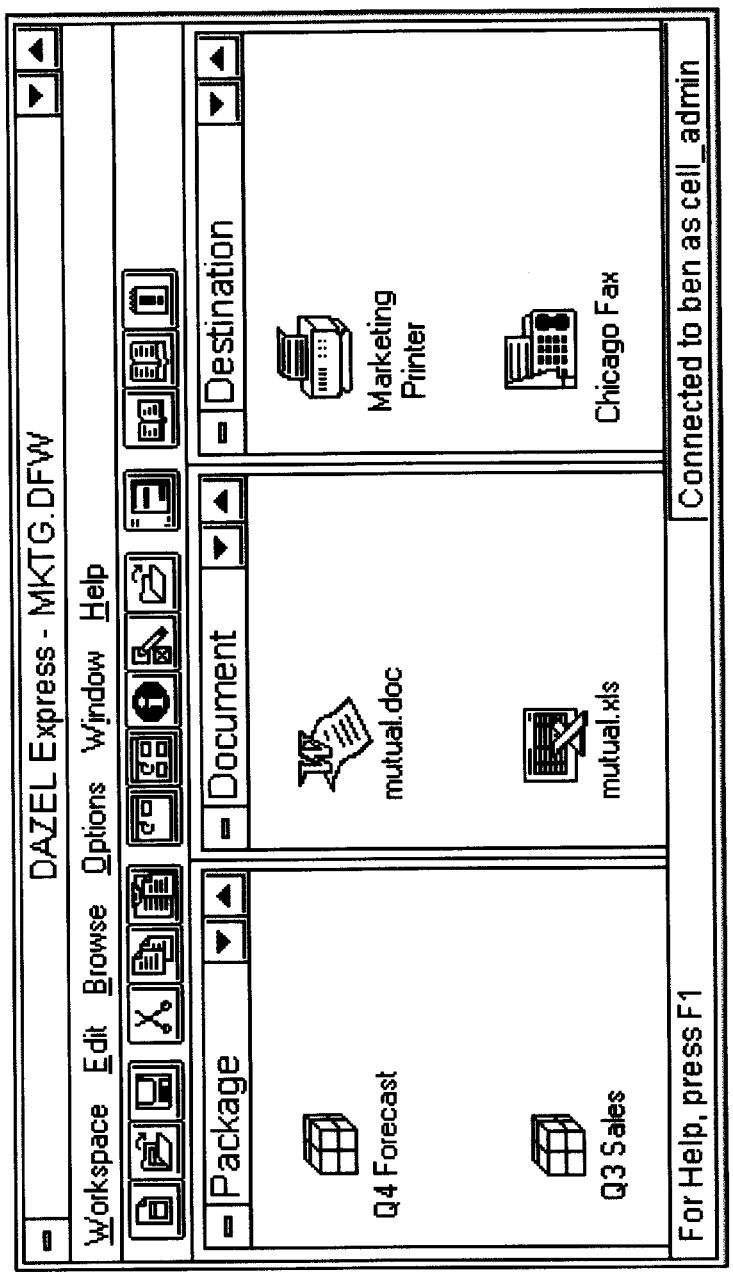
FIG. 7A is a representation of an alternative screen display according to the invention.

FIG. 7 shows a graphical user interface (GUI) screen display 140, which may be used according to the invention to create an electronic package data structure. The display may be a monitor (not shown) associated with a workstation or a terminal associated with some other type of computer processor. The GUI 140 provides a means for creating a representation or a metaphor for the electronic package and for creating the electronic package data structure itself. The GUI 140 provides several different workspaces, particularly a shelf workspace 142, a package workspace 144, and a destination workspace 146, each used in creating a data structure such as data structure 10 described with reference to FIG. 1. The shelf workspace 142 provides an area for assembling electronic packages, while the package workspace 144 provides a space for storing already created electronic packages and also may be used in creating electronic packages. The destination workspace 146 displays destinations which may be assembled into an electronic package.

The data structure (10 in FIG. 1) can be created with either the shelf workspace 142 or the package workspace 144. To create a data structure using the shelf workspace 142, the user displays within the workspace a document icon 148 associated with a document to be delivered and then a destination icon 150 associated with a destination device. The icons 148 and 150 may be selected or moved to a workspace by any number of different methods that may be used in a graphical user interface. For example, a destination icon 150 in the destination window may be selected with a mouse and dragged to the workspace 142, or may be selected from the destination workspace 146 by double clicking with a mouse. The invention encompasses any method for displaying the icons 148 and 150 within the shelf workspace 142. Furthermore, the GUI may provide lists of documents and destination names that may be selected by any suitable manner for inclusion in a workspace.

The act of displaying the document icon 148 in the shelf workspace 142 causes the application underlying the GUI 140 to write a document reference associated with the document icon to an area of storage associated with the shelf workspace. Similarly, displaying the destination icon 150 in the shelf workspace 142 causes the GUI 140 to write a destination reference into the storage area associated with the workspace. The user may also input other attributes associated with the destination into the storage area associated with the shelf workspace 142. The user may also enter package attributes into the storage area associated with the workspace by selecting the new package icon 152 or by selecting the delivery icon 154 adjacent the shelf workspace 142. In either case, the information written into the storage area associated with the shelf workspace 142 would then include the document reference, destination reference, and package attributes and would itself represent a data structure such as the data structure described with reference to FIG. 1. Once a new package is created using the new package icon 152, the GUI 140 creates a package icon 55 and displays the icon in the package workspace.

A data structure according to the invention may also be created through the GUI using the package workspace 144 shown in FIG. 7. Creating a data structure using the package workspace 144 includes first displaying an empty package icon 156 in the package workspace, thereby creating a storage area including package attributes. Using any suitable display technique, the user may then display desired document icons 158 and destination icons 160 in the package workspace 144 adjacent the empty package icon 156. The acts of displaying the icons writes associated document or destination references to the data structure. Other attributes of the package or destinations may be added at this time, or later when selecting to deliver the package.

The GUI 140 also provides the user with the ability to handle or manipulate a package on a package icon, such as icon 155, representing the electronic package and the underlying electronic package data structure such as the structure 10 shown in FIG. 1. For example, the GUI allows the electronic package and the underlying electronic package data structure to be edited, copied, or deleted. Also, packages from the package workspace 144 may be delivered or resent directly from the package workspace.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A method of creating a metaphor for an electronic package through the use of a graphical user interface, the electronic package used in delivering information to various output resources accessible by a computer network and comprising document references, destination references, and package attributes, the method comprising the steps of:
   (a) displaying within the graphical user interface an assembly workspace which may be used to assemble all document references and destination references within the electronic package;
   (b) for each document reference selected within the electronic package, displaying in the assembly workspace a document icon representing the particular document reference;
   (c) for each destination reference within the electronic package, displaying in the assembly workspace a destination icon representing the particular destination reference;
   (d) through the graphical user interface, adding package attributes to the electronic package, the package attributes controlling the delivery of a document associated with each document reference within the electronic package to a destination associated with a particular destination reference within the electronic package; and
   (e) displaying within the graphical user interface a package icon, the package icon representing the electronic package and having associated therewith the document reference for each document icon displayed in the assembly workspace for the electronic package, the destination reference for each destination icon displayed in the assembly workspace for the electronic package, and the package attributes added for the electronic package.

2. The method of claim 1 further comprising the step of:
   (a) displaying within the graphical user interface a document display area in which at least one document name and location may be displayed for selection in the electronic package.

3. The method of claim 1 further comprising the step of:
   (a) displaying within the graphical user interface a destination workspace in which at least one destination icon may be displayed for selection in the electronic package.

4. The method of claim 1 further comprising the step of:
   (a) displaying within the graphical user interface a package workspace in which the package icon may be displayed, the package workspace being delineated from the assembly workspace.

5. The method of claim 4 further comprising the step of:
   (a) displaying within the package workspace at least one open package icon with a package content boundary enclosing the open package icon, each document icon and destination icon within the electronic package being contained within the package content boundary.

6. The method of claim 1 wherein the step of displaying an assembly workspace comprises:
   (a) displaying within the graphical user interface a shelf workspace.

7. The method of claim 6 further comprising the steps of:
(a) displaying within the graphical user interface a destination workspace separate from the shelf workspace in which at least one destination icon may be displayed; and
(b) displaying within the graphical user interface a package workspace in which at least one package icon may be displayed.

8. An electronic data structure constructed on a digital computer and encapsulating the definition of an electronic package, the electronic data structure identifying information to be transferred from its originating location to a destination over a data transmission system such as a local area network, wide area network, telecommunication lines, and the like, the electronic data structure comprising:
(a) a document reference including a name, location, and format type of a document to be delivered, the document reference being stored within a first computer memory location and further including at least one document specific attribute selected from a group consisting of document size, document creation time, and document owner;
(b) a destination reference including a name and location of a destination to which the document is to be delivered and at least one destination specific attribute, the destination reference being stored within the first computer memory location along with the document reference; and
(c) package attributes which control the delivery of the document to the destination, the package attributes being stored within the first computer memory location along with the document reference and the destination reference.

9. The electronic data structure of claim 8 wherein the destination reference includes a destination type and the destination specific attributes are selected from the group consisting of number of copies, page start number, page stop number, page scaling options, header information, footer information, page numbering options, multiple paging options, banner sheet options, page length, page width, line wrapping options, and delivery messages.

10. The electronic data structure of claim 8 wherein the destination reference includes a destination type attribute and the destination type includes an identifier for a particular type of destination selected from the group consisting of at least post-script printers, text printers, facsimile machines, pagers, electronic mail accounts, electronic message handlers, and personal accounts.

11. A method for interpreting delivery instructions and delivering information to output resources accessible by a network of computers, the method comprising the steps of:
(a) creating an electronic package data structure comprising a software object which includes a document reference including a name of a document to be delivered, a destination reference including a name of a destination to which the document is to be delivered, and package attributes;
(b) transferring the electronic package data structure to a delivery service software system; and
(c) in response to the receipt of the electronic package data structure at the delivery service software system,
 (i) retrieving the document identified by the document reference;
 (ii) storing the document locally to a delivery manager;
 (iii) identifying a delivery request broker associated with the destination;
 (iv) transferring the document reference, destination reference, and package attributes to the identified delivery request broker;
 (v) transferring the document reference, destination reference, and package attributes to a delivery supervisor responsible for communication to the destination;
 (vi) with the delivery supervisor, interpreting the package attributes associated with the destination reference; and
 (vii) delivering the document from the delivery supervisor to the destination.

12. The method of claim 11 including the step of storing the document destination reference and package attributes to a queue associated with the delivery request broker.

13. The method of claim 12 further including the step of determining access rights to the document with the delivery request broker.

14. The method of claim 11 further including the step of:
(a) converting the document from an original format to the converted format responsive to a destination type attribute associated with the destination reference.

15. A method for creating an electronic package object type which is an encapsulation of information to be delivered, the destination to which the information is to be delivered, and instructions for the delivery process, the method comprising the steps of:
(a) defining a document containing information to be delivered;
(b) creating a document reference at a first computer memory location in response to the act of defining the document, the document reference including a name, location, and format type of the document along with at least one document specific attribute selected form a group consisting of document size, document creation time, and document owner;
(c) defining a destination to which the document is to be delivered;
(d) creating a destination reference at the first computer memory location in response to the act of defining the destination, the destination reference including attributes of the destination to which the document is to be delivered;
(e) defining delivery instructions affecting the delivery of the information to be delivered; and
(f) creating package attributes at the first computer memory location in response to the act of defining the delivery instructions.

16. The method of claim 15 wherein the destination reference includes a destination type and the destination type includes an identifier for a particular type of destination selected from the group consisting of post-script printers, text printers, facsimile machines, pagers, electronic mail accounts, and electronic message handlers.

17. The method of claim 15 wherein the destination reference includes a destination location and a destination type which identifies the type of device comprising the destination to which the document is to be delivered.

18. An apparatus for creating a metaphor for an electronic package through the use of a graphical user interface, the electronic package used in delivering information to various output resources accessible by a computer network and comprising document references, destination references, and package attributes, the apparatus comprising:
(a) workspace display means programmed in a digital computer for displaying within the graphical user interface an assembly workspace which may be used to assemble all document references and destination references within the electronic package;

(b) document defining means programmed in the digital computer for displaying in the assembly workspace a document icon for each document reference within the electronic package, each document icon representing a particular document reference;

(c) destination defining means programmed on the digital computer for displaying in the workspace a destination icon for each destination reference within the electronic package, each destination icon representing a particular destination reference;

(d) package attribute defining means programmed in the digital computer for adding package attributes to the electronic package, the package attributes controlling the delivery of a document associated with each document reference within the electronic package to a destination associated with a particular destination reference within the electronic package; and (e) package defining means programmed on the digital computer for displaying within the graphical user interface a package icon, the package icon representing the electronic package and having associated therewith the document reference for each document icon displayed in the assembly workspace for the electronic package, the destination reference for each destination icon displayed in the assembly workspace for the electronic package, and the package attributes added for the electronic package.

19. The apparatus of claim 18 further comprising:
(a) document display area means programmed in the digital computer for displaying within the graphical user interface a list of document names and locations for selecting a document to be included in the electronic package.

20. The apparatus of claim 18 further comprising:
(a) destination display means programmed in the digital computer for displaying within the graphical user interface a list of destination names and locations for selecting a destination to be included in the electronic package.

21. The apparatus of claim 20 further comprising:
(a) destination workspace display means programmed in the digital computer for displaying a destination workspace within the graphical user interface in which at least one destination icon may be displayed for selection in the electronic package.

22. The apparatus of claim 18 further comprising:
(a) package workspace display means programmed in the digital computer for displaying a package workspace within the graphical user interface in which the package icon may be displayed, the package workspace being delineated from the assembly workspace.

23. An apparatus for creating an object type electronic package which is an encapsulation of information to be delivered, the destination to which the information is to be delivered, and instructions for the delivery process, the apparatus comprising:
(a) data defining means programmed on a digital computer for defining a document containing information to be delivered, a destination to which the document is to be delivered, and delivery instructions affecting the delivery of the information to be delivered;
(b) document reference developing means programmed in the digital computer for creating a document reference at a first computer memory location when the document is defined by the data defining means, the document reference including a name, location, and format type of the document along with at least one document specific attribute selected from a group consisting of document size, document creation time, and document owner;

(c) destination developing means programmed in the digital computer for creating a destination reference at the first computer memory location when the data defining means defines the destination, the destination reference including attributes of the destination to which the document is to be delivered; and (d) package attribute developing means programmed on the digital computer for creating package attributes at the first computer memory location when the data defining means defines the delivery instructions.

24. A program product for creating a metaphor for an electronic package through the use of a graphical user interface, the electronic package used in delivering information to various output resources accessible by a computer network and comprising document references, destination references and package attributes, the program product comprising:
(a) a computer-readable storage medium;
(b) work space display means stored on the medium for displaying within the graphical user interface an assembly work space which may be used to assemble all document references and destination references within the electronic package;
(c) document defining means stored on the medium for displaying in the assembly work space a document icon for each document reference within the electronic package, each document icon representing a particular document reference;
(d) destination defining means stored on the medium for displaying in the work space a destination icon for each destination reference within the electronic package, each destination icon representing a particular destination reference;
(e) package attribute defining means stored on the medium for adding package attributes to the electronic package, the package attributes controlling the delivery of a document associated with each document reference within the electronic package to a destination associated with a particular destination reference within the electronic package; and
(f) package defining means stored on the medium for displaying within the graphical user interface a package icon, the package icon representing the electronic package and having associated therewith the document reference for each document icon displayed in the assembly work space for the electronic package, the destination reference for each destination icon displayed in the assembly work space for the electronic package, and the package attributes added for the electronic package.

25. The program product of claim 24 further comprising:
(a) destination work space display means stored on the medium for displaying within the graphical user interface a destination work space in which at least one destination icon may be displayed for selection in the electronic package.

26. The program product of claim 24 further comprising:
(a) package work space display means stored on the medium for displaying within the graphical user interface a package work space in which at least one package icon may be displayed for representing a previously created electronic package.

27. A program product for creating an object type electronic package which is an encapsulation of information to be delivered, the destination to which the information is to be delivered, and instructions for the delivery process, the program product comprising:

(a) a computer-readable storage medium;

(b) data defining means stored on the medium for defining a document containing information to be delivered, a destination to which the document is to be delivered, and delivery instructions affecting the delivery of the information to be delivered;

(c) document reference developing means stored on the medium for creating a document reference at a first computer memory location when the document is defined by the data defining means, the document reference including a name, location, and format type of the document along with at least one document specific attribute selected from a group consisting of document size, document creation time, and document owner;

(d) destination developing means stored on the medium for creating a destination reference at the first computer memory location when the data defining means defines the destination, the destination reference including attributes of the destination to which the document is to be delivered; and (e) package attribute developing means stored on the medium for creating package attributes at the first computer memory location when the data defining means defines the delivery instructions.

28. An apparatus for interpreting delivery instructions and delivering information to output resources accessible by a network of computers, the apparatus comprising:

(a) data input means for creating an electronic package data structure comprising a software object which includes a document reference including a name of a document to be delivered, a destination reference including a name of a destination to which the document is to be delivered, and package attributes;

(b) package input means programmed on a digital computer for transferring the electronic package data structure to a delivery service software system;

(c) delivery manager means programmed on a digital computer for retrieving and storing the document, interfacing with a name service to obtain an identification for a delivery request broker means associated with the destination, and transferring the document reference, a destination reference, and package attributes to the delivery request broker means associated with the destination;

(d) delivery request broker means programmed on a digital computer for transferring the document reference, destination reference, and package attributes to a delivery supervisor means responsible for communicating to the destination; and (e) delivery supervisor means programmed on a digital computer for receiving the document reference, destination reference, and package attributes and interpreting the document reference to determine the format of the data which comprises the document to be delivered, interpreting the destination reference to determine the format of the data required by the destination to which the document is to be delivered, and interpreting the package attributes, and for converting the document identified by the document reference to a converted format comprising the data format required by the destination reference, and delivering the document to the destination in the converted format.

29. The apparatus of claim 28 wherein the request broker means stores the document, destination reference, and package attributes in a delivery queue.

30. The apparatus of claim 28 further including:

(a) document converting means associated with the delivery supervisor means for converting the document from an original format to the converted format dictated by destination attributes associated with the destination reference.

31. A program product for operating on a network of computers to interpret delivery instructions and deliver information to output resources accessible by the network of computers, the program product comprising:

(a) a computer-readable storage medium;

(b) data input means stored on the medium for creating an electronic package data structure, the electronic package data structure comprising a software object which includes a document reference including a name of a document to be delivered, a destination reference including a name of a destination to which the document is to be delivered, and package attributes;

(c) package input means stored on the medium for transferring the electronic package data structure to a delivery service software system;

(d) delivery manager means stored on the medium for retrieving and storing the document, interfacing with a name service to obtain an identification for a delivery request broker means associated with the destination, and transferring the document reference, a destination reference, and package attributes to the delivery request broker means associated with the destination;

(e) delivery request broker means stored on the medium for transferring the document reference, destination reference, and package attributes to a delivery supervisor means responsible for communicating to the destination; and (f) delivery supervisor means stored on the medium for receiving the document reference, destination reference, and package attributes and interpreting the document reference to determine the format of the data which comprises the document to be delivered, interpreting the destination reference to determine the format of the data required by the destination to which the document is to be delivered, and interpreting the package attributes, and for converting the document identified by the document reference to a converted format comprising the data format required by the destination reference, and delivering the document to the destination in the converted format.

* * * * *